(12) United States Patent
Subasic et al.

(10) Patent No.: US 7,991,379 B2
(45) Date of Patent: Aug. 2, 2011

(54) RF TRANSMITTER AND RECEIVER FRONT-END

(75) Inventors: Bojan Subasic, Etobicoke (CA); Mathew A. Rybicki, Austin, TX (US)

(73) Assignee: ViXS Systems, Inc., Toronto, Ontario (CA)

( * ) Notice: Subject to any disclaimer, the term of this patent is extended or adjusted under 35 U.S.C. 154(b) by 1364 days.

(21) Appl. No.: 10/741,716

(22) Filed: Dec. 19, 2003

(65) Prior Publication Data

US 2005/0136880 A1  Jun. 23, 2005

(51) Int. Cl.
*H04B 1/16* (2006.01)
(52) U.S. Cl. .......................... 455/339; 455/130; 455/307
(58) Field of Classification Search .................. 455/73, 455/77, 91, 120, 150.1, 307, 339, 552.1, 455/553.1, 130
See application file for complete search history.

(56) References Cited

U.S. PATENT DOCUMENTS

| | | | | |
|---|---|---|---|---|
| 4,025,855 A | * | 5/1977 | Atkinson | 455/109 |
| 5,058,138 A | * | 10/1991 | Figura et al. | 375/334 |
| 5,339,455 A | * | 8/1994 | Vogt et al. | 455/307 |
| 5,796,772 A | * | 8/1998 | Smith et al. | 375/130 |
| 6,028,885 A | * | 2/2000 | Minarik et al. | 375/135 |
| 6,424,074 B2 | * | 7/2002 | Nguyen | 455/323 |
| 6,442,380 B1 | * | 8/2002 | Mohindra | 455/234.1 |
| 6,658,237 B1 | * | 12/2003 | Rozenblit et al. | 455/83 |
| 6,847,829 B2 | * | 1/2005 | Tanaka et al. | 455/552.1 |
| 7,158,768 B2 | * | 1/2007 | Woo et al. | 455/179.1 |
| 7,187,913 B1 | * | 3/2007 | Rahn et al. | 455/188.1 |
| 2001/0049271 A1 | * | 12/2001 | Hirtzlin et al. | 455/188.1 |
| 2002/0037742 A1 | * | 3/2002 | Enderlein et al. | 455/552 |

* cited by examiner

*Primary Examiner* — Quochien B Vuong
(74) *Attorney, Agent, or Firm* — Garlick Harrison & Markison; Jessica W. Smith

(57) ABSTRACT

A radio frequency receiver front-end includes a low noise amplifier, a mixing stage, and a selectable channel filter. The low noise amplifier is operably coupled to amplify inbound RF signals to produce amplified inbound RF signals. The mixing stage is operably coupled to mix amplified inbound RF signals with a $1^{st}$ local oscillation to produce a $1^{st}$ intermediate frequency (IF) signal. The selectable channel filter is operably coupled to pass a $1^{st}$ channel of the $1^{st}$ IF signal when a channel select signal is in a $1^{st}$ state and to pass a $2^{nd}$ channel of the $1^{st}$ IF signal when the channel select signal is in a $2^{nd}$ state to produce a selected channel.

22 Claims, 6 Drawing Sheets selectable channel filter 16

RF receiver front-end 10 selectable channel filter 16

RF receiver 55

RF receiver 60

RF transmitter front-end 70

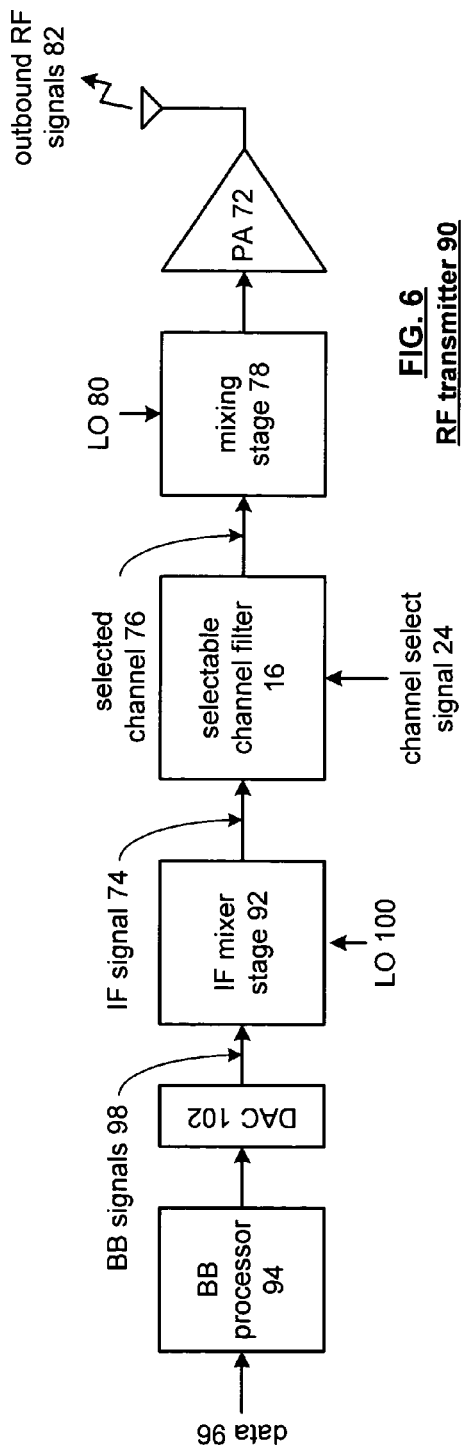
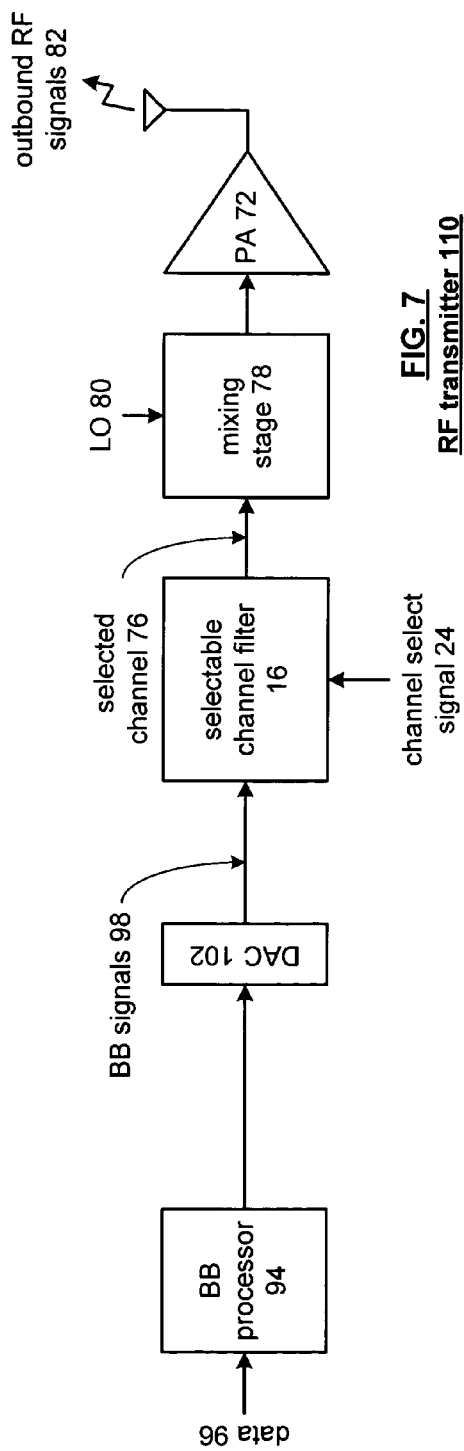

RF transceiver front-end 120

RF TRANSMITTER AND RECEIVER FRONT-END

BACKGROUND OF THE INVENTION

This invention relates generally to wireless communication systems and more particularly to radio frequency transmitters and receivers used within such systems.

DESCRIPTION OF RELATED ART

It is well known that a wireless transmission originates at a transmitter of one wireless communication device and ends at the receiver of another wireless communication device. The structure of the wireless transmission is dependent upon the wireless communication standard, or standards, being supported by the wireless communication devices. For example, IEEE 802.11a defines an orthogonal frequency division multiplexing (OFDM) wireless transmission protocol that included eight 20 MHz spaced channels in the lower band (e.g., 5.15 gigahertz to 5.35 gigahertz) and four 30 MHz spaced channels in the upper band (e.g., 5.725 gigahertz to 5.825 gigahertz). Each channel may include 64 sub-carriers, 48 of which carry data based on a sub-carrier modulation mapping. Such sub-carrier modulation mapping includes binary phase shift keying (BPSK), quadrature phase shift keying (QPSK), 16-quadrature amplitude modulation (QAM) or 64-QAM.

Typically, during a wireless transmission, only one channel carries valid data. Accordingly, the receiver tunes its one or more intermediate frequency (IF) stages such that the desired channel is centered within the filter response of the receiver to convert to baseband. As such the desired channel is recaptured as a baseband signal and subsequently decoded in accordance with the sub-carrier modulation mapping to obtain the transmitted data.

If, from one wireless transmission to the next, the channel is changed, the receiver needs to adjust its IF stage, or stages, in particular, change the frequency of the local oscillation, to receive the new channel. With current local oscillation designs, it takes hundreds of micro seconds to thousands of micro seconds to adjust from one local oscillation frequency to another. For 802.11a applications, the specification requires channel switching to take less than 1 micro-second. As such, adjusting the local oscillation as previously described is an unacceptable technique for channel switching in an 802.11a receiver. Note that the same issues exist within an 802.11 transmitter.

Therefore, a need exists for a fast channel switching radio frequency transmitter and a fast channel switching radio frequency receiver.

BRIEF SUMMARY OF THE INVENTION

The fast channel switching radio frequency receiver or transmitter of the present invention substantially meets these needs and others. In one embodiment, a radio frequency receiver front-end includes a low noise amplifier, a mixing stage, and a selectable channel filter. The low noise amplifier is operably coupled to amplify inbound RF signals to produce amplified inbound RF signals. The mixing stage is operably coupled to mix amplified inbound RF signals with a $1^{st}$ local oscillation to produce a $1^{st}$ intermediate frequency (IF) signal. The selectable channel filter is operably coupled to pass a $1^{st}$ channel of the $1^{st}$ IF signal when a channel select signal is in a $1^{st}$ state and to pass a $2^{nd}$ channel of the $1^{st}$ IF signal when the channel select signal is in a $2^{nd}$ state to produce a selected channel. By utilizing surface acoustic wave (SAW) filters and high frequency switches within the selectable channel filter, switching from one channel to another may be done in less than 1 micro-second.

In another embodiment, a radio frequency transmitter front-end includes a selectable channel filter, a mixer stage, and a power amplifier. The selectable channel filter is operably coupled to pass a $1^{st}$ channel of a $1^{st}$ intermediate frequency (IF) signal when a channel select is in a $1^{st}$ state and for passing a $2^{nd}$ channel of the $1^{st}$ IF signal when the channel select signal is in a $2^{nd}$ state to produce a selected channel. The mixer stage is operably coupled to mix the selected channel with a local oscillation to produce a radio frequency (RF) signal. The power amplifier is operably coupled to amplify the RF signal to produce outbound RF signals. When the selectable channel filter includes surface acoustic wave (SAW) filters and high frequency switches, the transition from one channel to another may be done in less than 1 micro-second.

In another embodiment, a radio frequency transceiver front-end includes a low noise amplifier, a receive mixer stage, a selectable channel filter, a transmit mixer stage and a power amplifier. The low noise amplifier is operably coupled to amplify an inbound RF signal to produce amplified inbound RF signals. The receive mixer stage is operably coupled to mix the amplified inbound RF signals with a $1^{ST}$ local oscillation to produce an inbound intermediate frequency (IF) signal. The transmit mixer stage is operably coupled to mix an outbound selected channel with a $2^{nd}$ local oscillation to produce a radio frequency (RF) signal. The power amplifier is operably coupled to amplify the radio frequency signal to produce an outbound radio frequency signal. The selectable channel filter is operably coupled to, when the RF transceiver is in a receive mode, to pass a $1^{st}$ channel of the inbound RF signal when a channel select signal is in a $1^{st}$ state and to pass a $2^{nd}$ channel of the inbound IF signal when the channel select signal is in a $2^{nd}$ state to produce an inbound selected channel. The selectable channel filter is also operably coupled to, when the RF transceiver is in a transmit mode, to pass a $1^{st}$ channel of an outbound intermediate frequency (IF) signal when the channel select signal is in the $1^{st}$ state and to pass a $2^{nd}$ channel of the outbound IF signal when the channel select signal is in a $2^{nd}$ state to produce the outbound selected channel.

BRIEF DESCRIPTION OF THE SEVERAL VIEWS OF THE DRAWINGS

FIG. 6 is a schematic block diagram of a radio frequency transmitter in accordance with the present invention;

FIG. 7 is a schematic block diagram of an alternate radio frequency transmitter in accordance with the present invention.

DETAILED DESCRIPTION OF THE INVENTION

Figure 1:
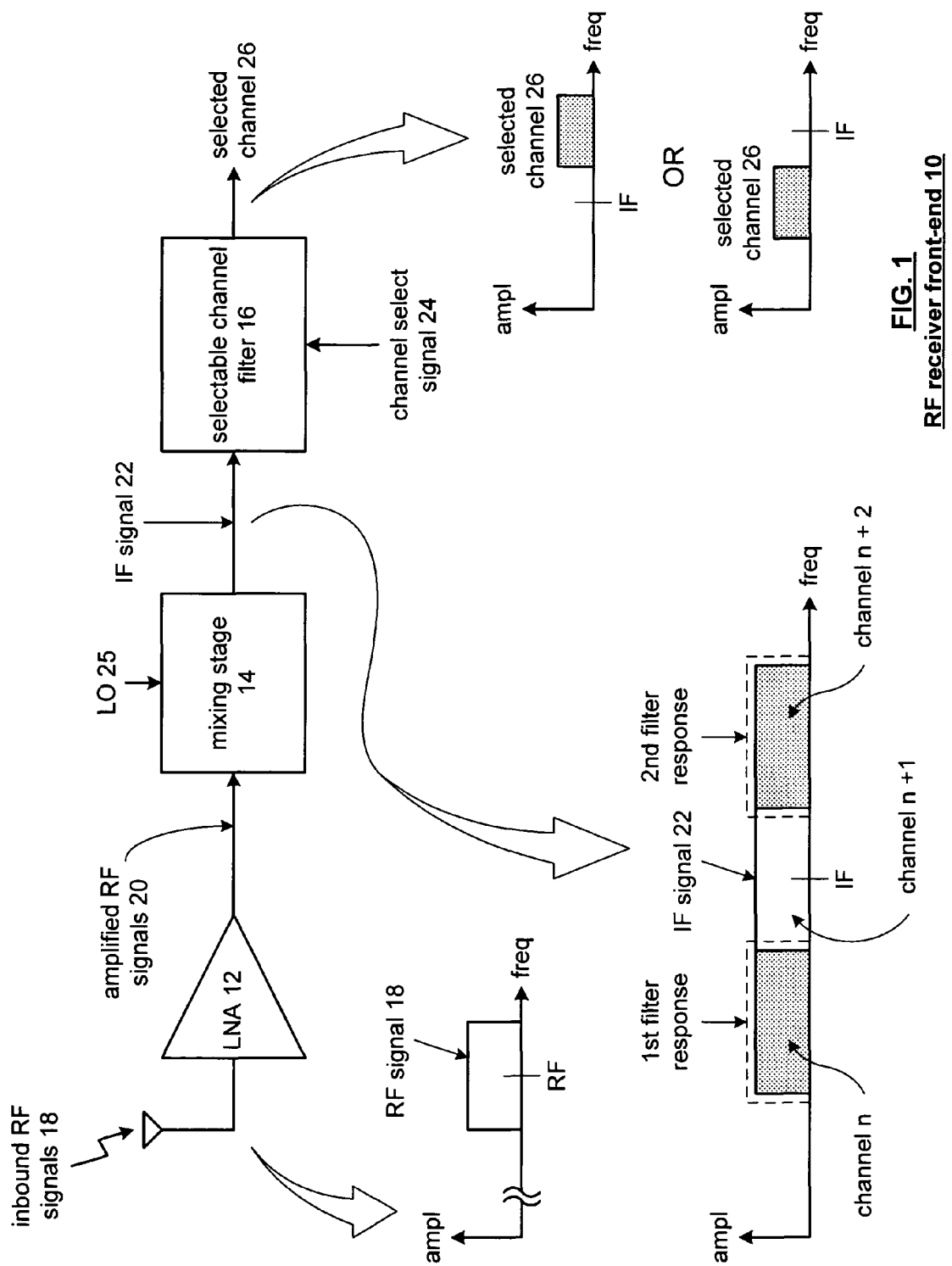
FIG. 1 illustrates a schematic block diagram of a radio frequency receiver front-end in accordance with the present invention.

FIG. 1 is a schematic block diagram of a radio frequency (RF) receiver front-end 10 that includes a low noise amplifier 12, a mixing stage 14 and a selectable channel filter 16. The low noise amplifier 12 is operably coupled to an antenna to receive inbound RF signals 18 and to produce amplified RF signals 20, there from. A graphical representation of the RF signals 18 is shown to include a signal having a certain bandwidth centered at the radio frequency (RF).

The mixing stage 14 mixes the amplified RF signal 20 with a local oscillation (LO) 25. The local oscillation 25 may be a frequency that is less than the frequency of the RF signals 18 or may be equal to the frequency of the RF signals 18. When the local oscillation 25 is equal to the RF signals 18, the receiver front-end 10 is performing a direct conversion. Conversely, when the local oscillation 25 is less than the frequency of the RF signals 18, the RF receiver front-end 10 is part of a super heterodyne receiver. Note that if the local oscillation 25 corresponds to the frequency of the RF signals 18 it may include an in-phase component and a quadrature component such that the resulting IF signal 22 is a complex baseband signal.

The resulting IF signal 22 is graphically illustrated to include a plurality of channels (channel n, n+1, n+2) centered about the intermediate frequency (IF). As is further illustrated, the $1^{st}$ and $2^{nd}$ filter responses of the selectable channel filter 16 encircle channel n and channel n+2, respectively.

The selectable channel filter 16, based on the channel select signal 24, activates the $1^{st}$ filter response or the $2^{nd}$ filter response to pass channel n or channel n+2 as the selected channel 26. As shown, the selected channel 26 may include channel n+2, which is slightly above the intermediate frequency (IF), or channel n, which is slightly below the intermediate frequency. Such channel switching may be done in fractions of a micro-second, which conforms to the receiver to transmitter turn around time requirements of IEEE 802.11.

Figure 2:
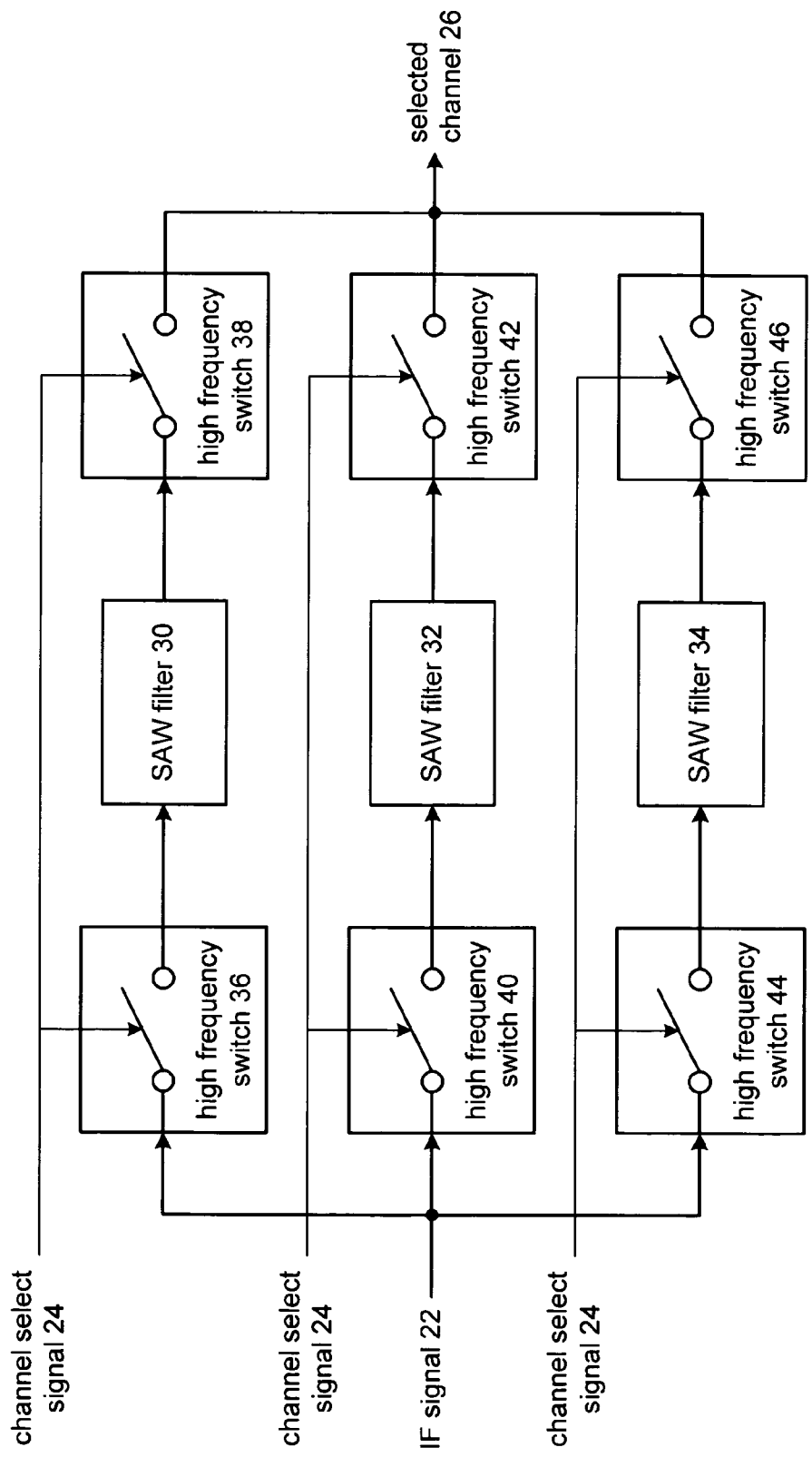
FIG. 2 is a schematic block diagram of a selectable channel filter in accordance with the present invention.

FIG. 2 is a schematic block diagram of the selectable channel filter 16 that includes a plurality of surface acoustic wave (SAW) filters 30-34 and a plurality of high frequency switches 36-46. The high frequency switches 36-46 may be commercially available switches that operate in the 2 gigahertz to 5 gigahertz range. The SAW filters 30-34 may have a bandpass region of approximately 20 MHz to correspond with the channel width of the desired channel but the bandwidth is centered at different frequencies. For example, with reference to the IF signal 22 of FIG. 1 and the selectable channel filter 16 of FIG. 2, SAW filter 30 may have a 20 MHz bandpass region centered at the IF frequency (e.g., 790 MHz)-20 MHz (e.g., 790-20=770 MHz), the $2^{nd}$ SAW filter 22 may have a 20 MHz bandpass region centered at the IF (e.g., 790 MHz) and the $3^{rd}$ SAW filter 34 may have a 20 MHz bandpass region centered at the IF frequency+20 MHz (e.g., 790+20=810 MHz).

The channel select signal 24, which may be produced in accordance with baseband processing as to which channel is being selected, enables a corresponding pair of high frequency switches 36-38, 40-42 or 44-46. As one of average skill in the art will appreciate, the selectable channel filter 16 may include only two SAW filters and corresponding high frequency switches or may include more than three SAW filters and corresponding high frequency switches.

Figure 3:
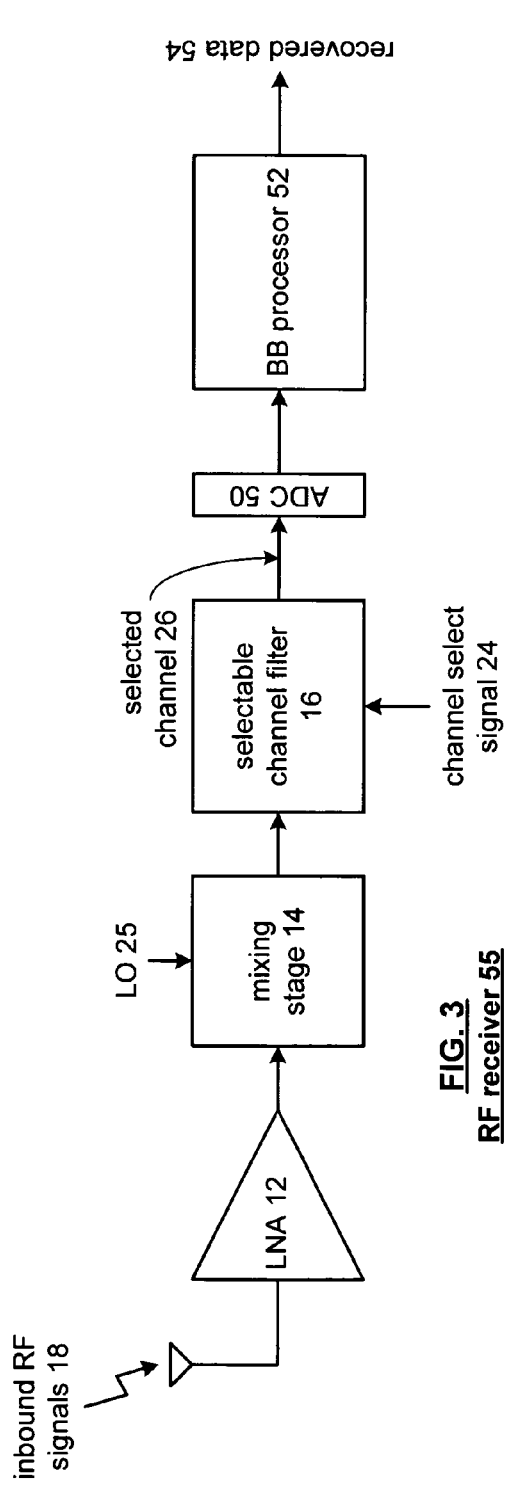
FIG. 3 is a schematic block diagram of a radio receiver in accordance with the present invention.

FIG. 3 is a schematic block diagram of a direct conversion radio receiver 55 that includes the low noise amplifier 12, mixing stage 14, selectable channel filter 16, analog-to-digital converter 50 and a baseband processor 52. In this instance, the frequency of local oscillation 25 corresponds to the frequency of the inbound RF signals 18 such that the selected channel 26 is a baseband signal. The baseband processor 52 processes the digital representation of the selected channel in accordance with a sub-carrier modulation mapping protocol to produce recovered data 54.

Figure 4:
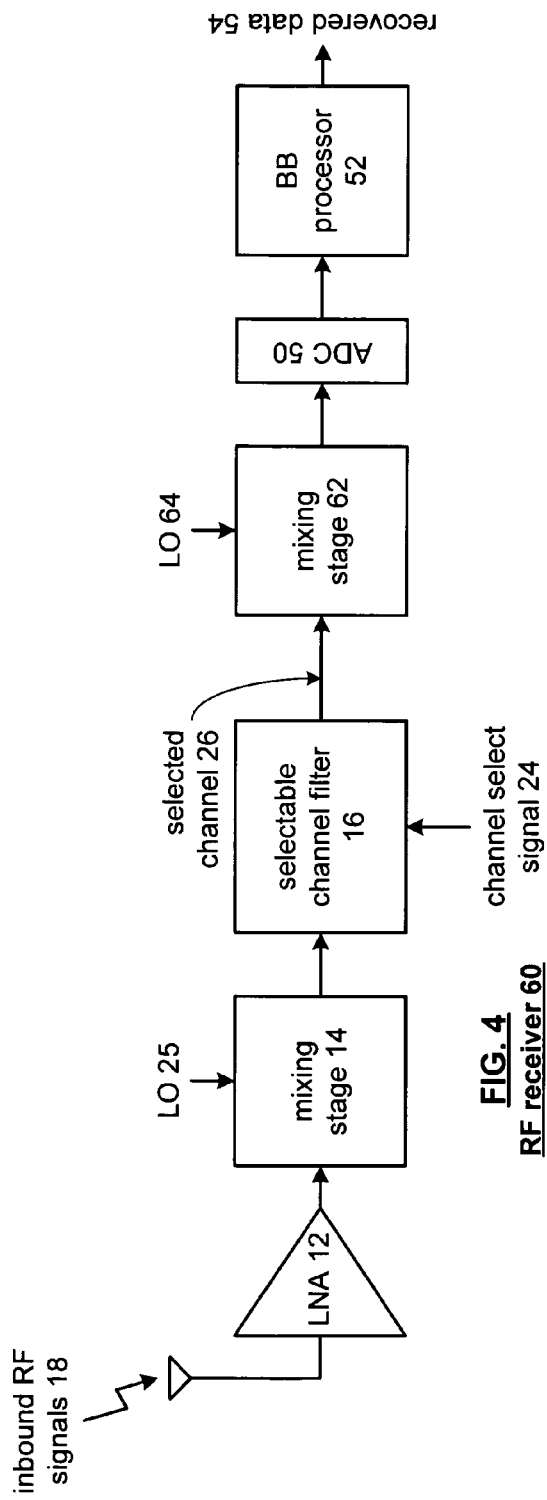
FIG. 4 is a schematic block diagram of an alternate radio receiver in accordance with the present invention.

FIG. 4 is a schematic block diagram of a super heterodyne receiver 60 that includes the low noise amplifier 12, mixing stage 14, selectable channel filter 16, mixing stage 62, analog-to-digital converter 50 and baseband processor 52. The local oscillation 25 corresponding to mixing stage 14 may be 4.4 gigahertz for inbound radio frequency signals 18 having a frequency of 5.21 gigahertz.

The selectable channel filter 16 selects one of the channels IF signal produced by mixing stage 14 to produce the selected channel 26, which is provided to mixing stage 62. The mixing stage 62 mixes the selected channel 26 with the local oscillation 64 (e.g., 790 MHz) to produce a baseband signal. The analog-to-digital converter 50 converts the baseband signal into a digital signal that is subsequently processed by baseband processor 52 to produce recovered data 54.

Figure 5:
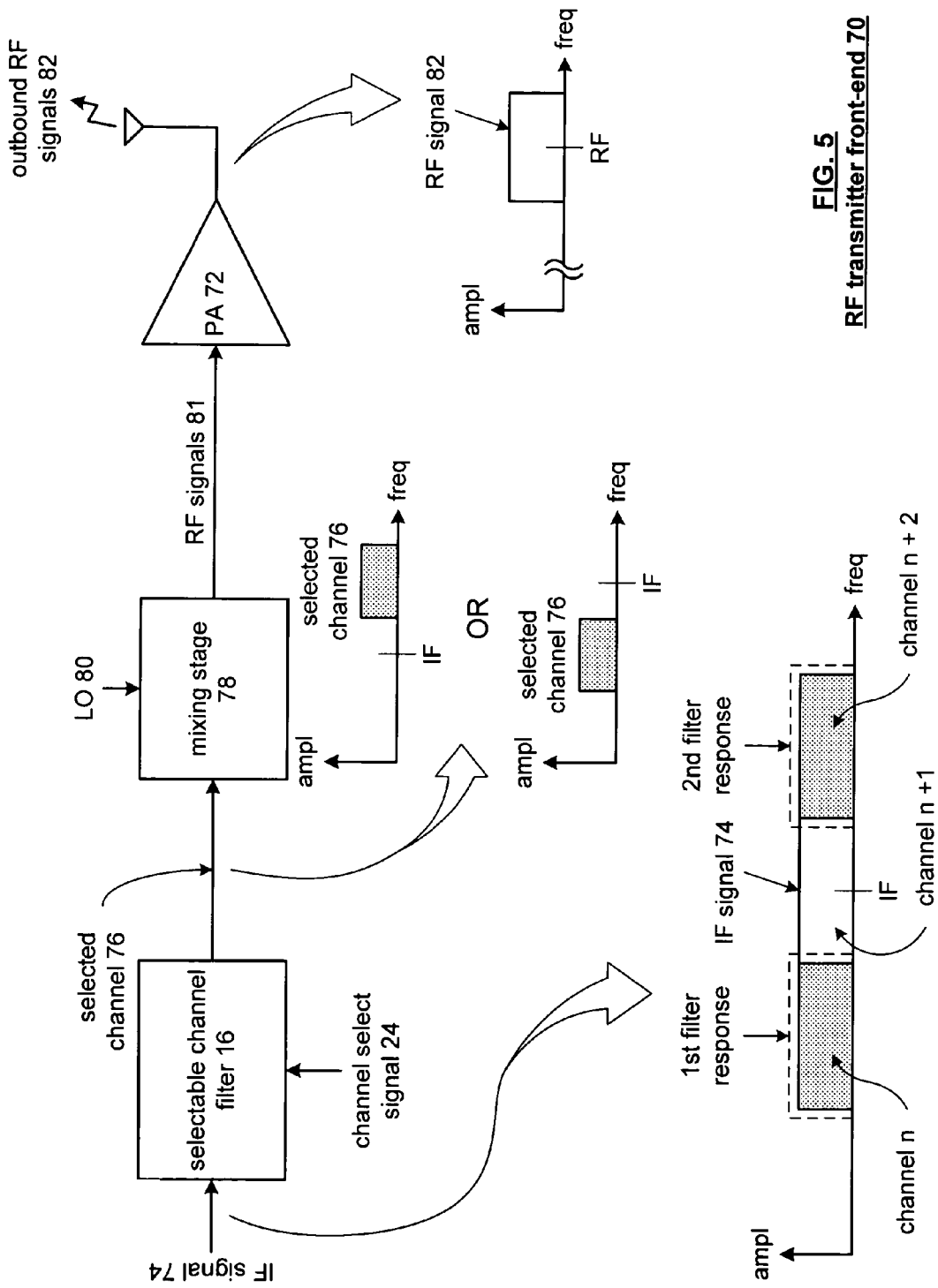
FIG. 5 is a schematic block diagram of a radio frequency transmitter front-end in accordance with the present invention.

FIG. 5 is a schematic block diagram of an RF transmitter front-end 70 that includes the selectable channel filter 16, mixing stage 78 and a power amplifier 72. The selectable channel filter 16, based on the channel select signal 24 selects a channel from IF signal 74. IF signal 74 is graphically illustrated to include a plurality of channels and further illustrates the corresponding filter response of the selectable channel filter 16. Note that the IF signal may be baseband for a direct conversion transmitter or at an intermediate frequency of a super heterodyne transmitter.

The mixing stage 78 mixes the selected channel 76 with a local oscillation to produce an RF signal 81 that corresponds to the selected channel 76. The power amplifier 72 amplifies RF signals 81 to produce outbound RF signals 82. The outbound RF signals 82 are transmitted via the corresponding antenna.

FIG. 6 is a schematic block diagram of a super heterodyne transmitter 90 that includes a baseband processor 94, digital-to-analog converter 102, a $1^{st}$ IF mixer stage 92, the selectable channel filter 16, mixer stage 78 and the power amplifier 72. In this embodiment, the baseband processor 92 processes data 96 in accordance with a sub-carrier modulation mapping protocol to produce digital baseband signals. The digital-to-analog converter 102 converts the digital baseband signals into analog baseband signals 98.

The IF mixer stage 92 mixes a $1^{st}$ local oscillation 100 (e.g., 790 MHz) with baseband signals 98 to produce an IF signal 74. The selectable channel filter 16, based on the channel select signal 24, passes one of the channels from the IF signal 74 to produce selected channel 76. Mixing stage 78 mixes the selected channel 76 with local oscillation 80 (e.g., 4.4 gigahertz) to produce an RF signal that is subsequently transmitted via the antenna and power amplifier 72.

FIG. 7 is a schematic block diagram of a direct conversion radio frequency transmitter 110 that includes the baseband processor 94, digital-to-analog converter 102, selectable channel filter 16, mixing stage 78 and power amplifier 72. In this embodiment, the selectable channel filter 16 passes one of the channels from baseband signal 98 to produce the selected channel 76. The functionality of the mixing stage 78 and power amplifier 72 are as previously described.

Figure 8:
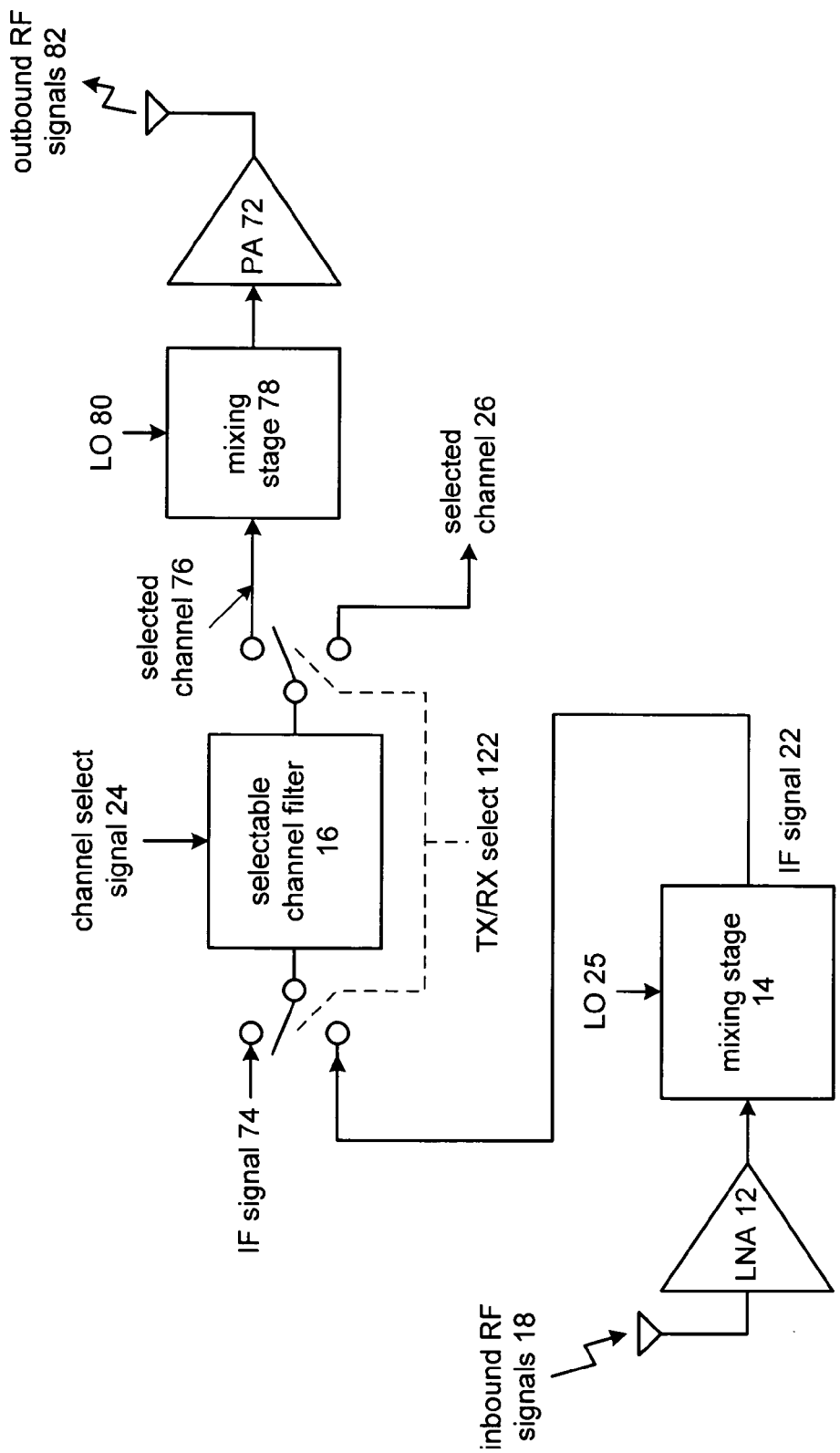
FIG. 8 is a schematic block diagram of a radio frequency transceiver front-end in accordance with the present invention.

FIG. 8 is a schematic block diagram of a radio frequency transmitter front-end 120 that includes the low noise amplifier 12, mixing stage 14, selectable channel filter 16, mixing stage 78 and power amplifier 72. In this embodiment, the transmitter and receiver share the selectable channel filter 16. For instance, when the transceiver is in a transmit mode, IF signals 74 are provided to the selectable channel filter 16 that, based on the channel select signal 24 produces selected channel 76. Mixing stage 78 and power amplifier 72 process the selected channel 76 as previously described. When the transceiver is in a receive mode, the selectable channel filter 16 receives IF signals 22 from mixing stage 14 and produces selected channel 26 there from.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a high speed channel switching radio frequency receiver and a high speed channel switching radio frequency transmitter. By incorporating a selectable channel filter, which may selectively filter standardized channels or non-standard channels, high speed channel switching is accomplished. As one of average skill in the art will appreciate, other embodiments may be derived from the teaching of the present invention without deviating from the scope of the claims.

What is claimed is:

1. A radio frequency (RF) receiver front-end comprises:
   low noise amplifier operably coupled to amplify an inbound RF signal to produce amplified inbound RF signal;
   mixer stage operably coupled to mix the amplified inbound RF signal with a first local oscillation to produce a first intermediate frequency (IF) signal, wherein the first IF signal includes a frequency band with a plurality of channels; and
   selectable channel filter that activates a first filter response below an intermediate frequency for passing a first channel of the plurality of channels of the first IF signal when a channel select signal is in a first state and that activates a second filter response above the intermediate frequency for passing a second channel of the plurality of channels of the first IF signal when the channel select signal is in a second state to produce a selected channel.

2. The RF receiver front-end of claim 1, wherein the selectable channel filter comprises:
   a first surface acoustic wave (SAW) filter having a band pass region corresponding to the first channel;
   a second SAW filter having a band pass region corresponding to the second channel; and
   a high frequency switch operably coupled to provide the first IF signal to the first SAW filter when the channel select signal is in the first state and to provide the first IF signal to the second SAW filter when the channel select signal is in the second state.

3. The RF receiver front-end of claim 2 further comprises:
   an intermediate frequency (IF) mixer stage operably coupled to mix the selected channel with a second local oscillation to produce a baseband signal, wherein the selectable channel filter further includes:
   a second high frequency switch operably coupled to provide the first channel from the first SAW filter to the IF mixer stage when the channel select signal is in the first state and to provide the second channel from the second SAW filter to the IF mixer stage when the channel select signal in the second state.

4. The RF receiver front-end of claim 2, wherein the selectable channel filter further comprises:
   the first SAW filter having a 20 Mega-Hertz (MHz) band pass region centered at approximately 770 MHz;
   the second SAW filter having a 20 MHz centered at approximately 810 MHz, wherein frequency of the inbound RF signal is approximately 5.2 giga-Hertz (GHz) and the first local oscillation is approximately 4.4 GHz.

5. The RF receiver front-end of claim 1, wherein the first local oscillation comprises a frequency substantially equal to the inbound RF signal.

6. The RF receiver front-end of claim 1, wherein the selectable channel filter further comprises: passing a third channel of the plurality of channels of the first IF signal as the selected channel when the channel select signal is in a third state.

7. A radio frequency (RF) transmitter front-end comprises:
   selectable channel filter that activates a first filter response below an intermediate frequency for passing a first channel of a plurality of channels within a first intermediate frequency (IF) signal when a channel select signal is in a first state and that activates a second filter response above the intermediate frequency for passing a second channel of the plurality of channels within the first IF signal when the channel select signal is in a second state to produce a selected channel;
   mixer stage operably coupled to mix the selected channel with a local oscillation to produce a radio frequency (RF) signal; and
   power amplifier operably coupled to amplify RF signal to produce an outbound RF signal.

8. The RF transmitter front-end of claim 7, wherein the selectable channel filter comprises:
   a first surface acoustic wave (SAW) filter having a band pass region corresponding to the first channel;
   a second SAW filter having a band pass region corresponding to the second channel; and
   a high frequency switch operably coupled to provide the selected channel from the first SAW filter to the mixer stage when the channel select signal is in the first state and to provide the selected channel from the second SAW filter to the mixer stage when the channel select signal is in the second state.

9. The RF transmitter front-end of claim 8 further comprises:

an intermediate frequency (IF) mixer stage operably coupled to mix a baseband signal with a second local oscillation to produce the first IF signal, wherein the selectable channel filter further includes:
a second high frequency switch operably coupled to provide the first IF signal to the first SAW filter when the channel select signal is in the first state and to provide the first IF signal to the second SAW filter when the channel select signal in the second state.

10. The RF transmitter front-end of claim 9, wherein the selectable channel filter further comprises:
the first SAW filter having a 20 Mega-Hertz (MHz) band pass region centered at approximately 770 MHz;
the second SAW filter having a 20 MHz centered at approximately 810 MHz, wherein frequency of the outbound RF signals is approximately 5.2 giga-Hertz (GHz) and the local oscillation is approximately 4.4 GHz.

11. The RF transmitter front-end of claim 7, wherein the local oscillation comprises a frequency substantially equal to the outbound RF signal.

12. The RF transmitter front-end of claim 7, wherein the selectable channel filter further comprises:
passing a third channel of a plurality of channels within the first IF signal as the selected channel when the channel select signal is in a third state.

13. A radio frequency (RF) transceiver front-end comprises:
low noise amplifier operably coupled to amplify an inbound RF signal to produce amplified inbound RF signal;
receive mixer stage operably coupled to mix the amplified inbound RF signal with a first local oscillation to produce an inbound intermediate frequency (IF) signal, wherein the inbound IF signal includes a plurality of channels centered at approximately an intermediate frequency;
selectable channel filter operably coupled to:
when the RF transceiver front-end is in a receive mode:
activates a first filter response centered below the intermediate frequency to pass a first channel of the plurality of channels of the inbound IF signal when a channel select signal is in a first state;
and activates a second filter response centered above the intermediate frequency to pass a second channel of the plurality of channels of the inbound IF signal when the channel select signal is in a second state to produce an inbound selected channel;
when the RF transceiver front-end is in a transmit mode:
activates the first filter response centered below the intermediate frequency to pass a first channel of a plurality of channels of an outbound intermediate frequency (IF) signal when the channel select signal is in the first state; and
activates the second filter response centered above the intermediate frequency to pass a second channel of a plurality of channels of the outbound IF signal when the channel select signal is in a second state to produce an outbound selected channel;
transmit mixer stage operably coupled to mix the outbound selected channel with a second local oscillation to produce a radio frequency (RF) signal; and
power amplifier operably coupled to amplify RF signal to produce an outbound RF signal.

14. The RF transceiver front-end of claim 13, wherein the selectable channel filter comprises:

a first surface acoustic wave (SAW) filter having a band pass region corresponding to the first channel of the inbound IF signal and of the outbound IF signal;
a second SAW filter having a band pass region corresponding to the second channel of the inbound IF signal and of the outbound IF signal; and
a high frequency switch operably coupled to provide the first IF signal to the first SAW filter when the channel select signal is in the first state and to provide the first IF signal to the second SAW filter when the channel select signal in the second state.

15. The RF transceiver front-end of claim 14 further comprises:
an intermediate frequency (IF) mixer stage operably coupled to mix the inbound selected channel with a third local oscillation to produce a baseband signal, wherein the selectable channel filter further includes:
a second high frequency switch operably coupled to provide the first channel of the inbound IF signal from the first SAW filter to the IF mixer stage when the channel select signal is in the first state and to provide the second channel of the inbound IF signal from the second SAW filter to the IF mixer stage when the channel select signal in the second state.

16. The RF transceiver front-end of claim 15 further comprises:
an intermediate frequency (IF) mixer stage operably coupled to mix a baseband signal with a third local oscillation to produce the outbound IF signal, wherein the selectable channel filter further includes:
a second high frequency switch operably coupled to provide the outbound IF signal to the first SAW filter when the channel select signal is in the first state and to provide the outbound IF signal to the second SAW filter when the channel select signal is in the second state.

17. The RF transceiver front-end of claim 14, wherein the selectable channel filter further comprises:
the first SAW filter having a 20 Mega-Hertz (MHz) band pass region centered at approximately 770 MHz;
the second SAW filter having a 20 MHz centered at approximately 810 MHz, wherein frequency of the inbound RF signals is approximately 5.2 giga-Hertz (GHz) and the first local oscillation is approximately 4.4 GHz.

18. The RF transceiver front-end of claim 14, wherein the first and second local oscillations comprise a frequency substantially equal to the inbound and outbound RF signals.

19. The RF transceiver front-end of claim 13, wherein the selectable channel filter further comprises: passing a third channel of the plurality of channels in the inbound or outbound IF signal when the channel select signal is in a third state.

20. A method for processing inbound and outbound radio frequency (RF) signals, comprising:
amplifying the inbound RF signal to produce an amplified inbound RF signal;
mixing the amplified inbound RF signal with a first local oscillation to produce an inbound intermediate frequency (IF) signal approximately centered at an intermediate frequency, wherein the inbound IF signal includes a plurality of channels; and
when in a receive mode, selectively activating a first filter response below the intermediate frequency to pass a first channel of the plurality of channels of the inbound IF signal when a channel select signal is in a first state and activating a second filter response above the intermediate frequency to pass a second channel of the plurality of channels of the inbound IF signal when the channel select signal is in a second state to produce an inbound selected channel.

21. The method of claim 20, further comprising:
when in a transmit mode, selectively passing a first channel of a plurality of channels of an outbound intermediate frequency (IF) signal when the channel select signal is in the first state and passing a second channel of a plurality of channels of the outbound IF signal when the channel select signal is in a second state to produce an outbound selected channel;
mixing the outbound selected channel with a second local oscillation to produce a radio frequency (RF) signal; and
amplifying the RF signal to produce the outbound RF signal.

22. The method of claim 21, wherein the step of selectively passing a first channel of a plurality of channels of an outbound intermediate frequency (IF) signal when the channel select signal is in the first state; and
passing a second channel of a plurality of channels of the outbound IF signal when the channel select signal is in a second state to produce an outbound selected channel, comprises:
switching to provide the first IF signal to a first surface acoustic wave (SAW) filter when the channel select signal is in the first state and to provide the first IF signal to a second SAW filter when the channel select signal in the second state, wherein the first SAW filter has a band pass region corresponding to the first channel of the inbound IF signal and of the outbound IF signal and wherein the second SAW filter has a band pass region corresponding to the second channel of the inbound IF signal and of the outbound IF signal.

* * * * *